US006036893A

United States Patent [19]

Lier et al.

[11] Patent Number: 6,036,893

[45] Date of Patent: Mar. 14, 2000

[54] METHOD OF MAKING AN ANTENNA LENS

[75] Inventors: Juergen Lier, Stuttgart; Joerg Schneeman, Weissach, both of Germany

[73] Assignee: Robert Bosch GmbH, Stuttgart, Germany

[21] Appl. No.: 09/119,852

[22] Filed: Jul. 21, 1998

[30] Foreign Application Priority Data

Sep. 18, 1997 [DE] Germany ........................... 197 41 081

[51] Int. Cl.[7] ........................................ B29D 11/00

[52] U.S. Cl. ............................ 264/1.7; 264/1.1; 343/753

[58] Field of Search ............................ 264/1.1, 1.7, 2.1; 343/753, 754; 425/808; 428/325, 412

[56] References Cited

U.S. PATENT DOCUMENTS

| | | | |
|---|---|---|---|
| 2,716,190 | 8/1955 | Baker | 264/1.7 |
| 2,887,684 | 5/1959 | Dexter et al. | 343/753 |
| 3,255,451 | 6/1966 | Wolcott | 343/753 |
| 3,321,763 | 5/1967 | Ikrath et al. | 343/754 |
| 4,458,249 | 7/1984 | Valentino et al. | 343/754 |
| 4,769,646 | 9/1988 | Raber et al. . | |
| 4,872,019 | 10/1989 | Chow et al. | 343/753 |
| 5,154,973 | 10/1992 | Imagawa et al. . | |

FOREIGN PATENT DOCUMENTS

| | | | |
|---|---|---|---|
| 61-100420 | 5/1986 | Japan | 264/1.7 |

*Primary Examiner*—Mathieu D. Vargot
*Attorney, Agent, or Firm*—Michael J. Striker

[57] ABSTRACT

The process for making an antenna lens having a lens core and a coating layer surrounding it includes making a stiff shell (1,2) forming a lens coating layer in a predetermined shape suitable for the antenna lens so that the stiff shell has a hollow space, and filling the hollow space of the shell with a flowing, powdery or paste-like material to form the lens core.

9 Claims, 1 Drawing Sheet

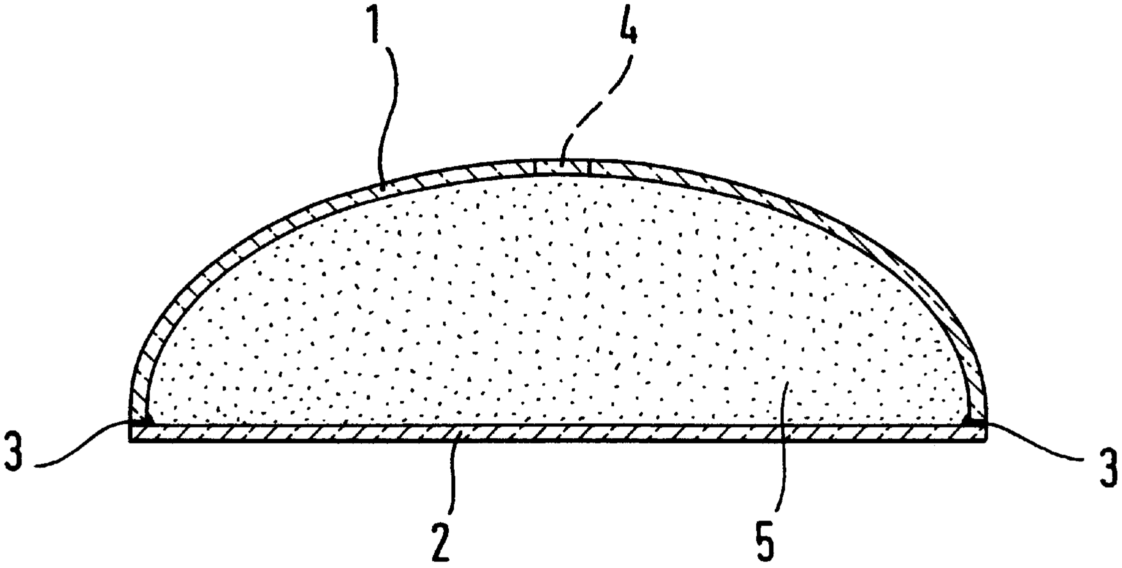
1
4
3
3
2
5

METHOD OF MAKING AN ANTENNA LENS

BACKGROUND OF THE INVENTION

The present invention concerns a process of making an antenna lens comprising a lens core and a coating layer surrounding it.

Antenna lenses made of dielectric material are described in U.S. Pat. No. 4,769,646. These antenna lenses can have planar or also structured surfaces for forming a beam. The so-called Fresnel structure is an example of a known surface structure of an antenna lens. So that the antenna lens has as compact a structure as possible, it must have a short focal length. This may be achieved by using dielectric material for the lens that has a very high dielectric constant ($\epsilon>9$). As described in the disclosure of a dielectric antenna lens in U.S. Pat. No. 5,154,973, ceramic material fulfills this requirement for a high dielectric constant. Suitable ceramic materials given in that reference include, for example, $CaTiO_3$, $SrTiO_3$, $BaO—Nd_2O_3—TiO_2$, $BaTiO_3$ and ZnO. According to U.S. Pat. No. 5,154,973 the lens core or lens body made from a ceramic material is surrounded with coating layer in order to reduce reflections in the antenna lens as much as possible. This coating layer is then at its most effective, when it is made from a material with a dielectric constant that corresponds approximately to the square root of the dielectric constant of the lens core made from the ceramic material. The coating layer with which the lens core is coated is made of plastic according to the state of the art.

According to past experiences in the art large process engineering expenses are required to make a ceramic lens with a diameter greater than 20 cm.

SUMMARY OF THE INVENTION

It is an object of the present invention to provide a method or process of making an antenna lens of the above-described type with manufacturing expenses that are as small as possible.

According to the invention, this object is attained by a process for making an antenna lens comprising a lens core and a coating layer surrounding it that includes making a stiff shell forming the coating layer in the desired shape of the antenna lens so that the stiff shell is provided with a hollow space and filling the hollow space of the shell with a flowing, powdery or paste-like material, advantageously completely, to form the lens core.

The shell forming the coating layer that is not made of a ceramic material may be made in a simple way with conventional methods. Filling the interior hollow space in the shell with a flowing, powdery or paste-like material is similarly very simple by means of process engineering methods.

There are several advantageous embodiments of this invention. For example it is appropriate to make the shell from two separate half shells or shell parts and to put them together subsequently to form the complete closed shell with the hollow space. The shell can be made from a plastic by a deep drawing method or by injection molding.

The fluid, powdery or paste-like material is preferably introduced through an opening in the shell that is subsequently closed. Plastic material and mixtures of plastic material with ceramic material can be used as the material for the lens core.

BRIEF DESCRIPTION OF THE DRAWING

The objects, features and advantages of the invention will now be illustrated in more detail with the aid of the description of the preferred embodiment hereinbelow, with reference to the drawing in which the sole FIGURE is a cross-sectional view through an antenna lens according to the invention.

DESCRIPTION OF THE PREFERRED EMBODIMENT

Two stiff shell parts 1 and 2 are made in a first method step of the process for making the antenna lens according to the invention. These two stiff shell parts are shaped according to the desired surface structure of the lens. In the illustrated embodiment the surface is smooth on both shell parts 1 and 2. However other surface structures are possible in other embodiments according to choice, for example a Fresnel structure. Both shell parts 1 and 2 are made from a plastic material whose dielectric constant corresponds to the square root of the electricity constants of the actual lens material of the still-to-be-described lens core. With these prerequisites the shell parts 1 and 2 form an ideal coating layer for the lens. Plastic materials, such as plexiglass, polycarbonate or the like, can be used for the shell parts 1 and 2. Suitable materials also include for example cyclodiene copolymers, polyolefins, polyphenylene ether, acryl nitride, styrene, acrylic ester polymers and modified styrene polymers. In the event a dielectric constant less than 2 is required for the shell parts, the previously mentioned materials can also used in foam form.

The shell parts 1 and 2 can be made by continuous methods, such as deep drawing or injection molding, with a wall thickness between 2 and 10 mm. The planar shell part 2 can be a cast or extruded plate.

Both separately manufactured shell parts 1 and 2 are subsequently assembled to form a closed shell, in which they are joined together at their edges or separating boundaries 3 by welding, gluing or with a suitable connection means, for example a snap coupling.

Both shells 1 and 2 have, on the one hand, the function of a coating layer for the lens and, on the other hand, form a fixed bounded space with the predetermined shape of the antenna lens. This space is now filled with a fluid or powdery or paste-like material 5 that forms the lens core. The fluid or powdery or paste-like material 5 is selected so that it has a dielectric constant required for the lens core. Suitable materials for the material 5 include, for example, polyethylene or polypropylene or a ceramic material, such as $Al_2O_3$, $TiO_2$ or $CaZO_x$.

In order to bring the fluid or powdery or paste-like material 5 into the hollow space of the shell 1,2, an opening 4 can be provided in the shell that is again sealed or closed after introducing the material.

The disclosure of German Patent Application 197 41 081.2-35 of Sep. 18, 1997 is hereby explicitly incorporated by reference. This German Patent Application discloses the same invention as described herein and claimed in the claims appended hereinbelow and is the basis for a claim of priority for the instant invention under 35 U.S.C. 119.

While the invention has been illustrated and described as embodied in a method or process for making an antenna lens, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A process for making an antenna lens including a lens core and a coating layer surrounding the lens core, said process comprising the steps of:

a) making a stiff shell forming a lens coating layer in a predetermined antenna lens shape so that said stiff shell is provided with a hollow space, the stiff shell forming the lens coating layer being made of two separate plastic shell parts (1,2) which are assembled to form said stiff shell and b) filling the hollow space of the shell with a flowing, powdery or paste material (5) to form the lens core.

2. The process as defined in claim 1, wherein said shell parts (1,2) are made of plastic material in a deep drawing process.

3. The process as defined in claim 1, wherein said shell parts (1,2) are made of plastic material by an injection molding method.

4. The process as defined in claim 1, further comprising providing an opening (4) in said stiff shell, feeding the flowing, powdery or paste material (5) through the opening (4) into the stiff shell and closing said opening (4).

5. The process as defined in claim 1, wherein the lens core is made of a ceramic material.

6. The process as defined in claim 1, wherein said lens core is made of plastic material.

7. The process as defined in claim 1, wherein said lens core is made of plastic filled with ceramic material.

8. A method of making an antenna lens including a lens core and a coating layer surrounding the lens core, said method comprising the steps of:

a) making two stiff shell parts (1,2) shaped according to a predetermined surface structure of said antenna lens from a plastic material by deep drawing or injection molding;

b) assembling the two stiff shell parts (1,2) to form a stiff shell provided with a hollow space between said stiff shell parts;

c) filling the hollow space provided in said stiff shell with a flowing, powdery or paste material (5); and d) selecting said plastic material so that said plastic material has a dielectric constant corresponding to the square root of a dielectric constant of said flowing, powdery or paste material (5);

whereby said two stiff shell parts form the coating layer and said flowing, powdery or paste material forms the lens core.

9. The method as defined in claim 8, wherein said plastic material is plexiglass or polycarbonate and said flowing, powdery or paste material is a ceramic material, polyethylene or polypropylene.

* * * * *